Jan. 19, 1960 — T. O'QUINN — 2,921,762
HOSE NOZZLE HOLDER
Filed Feb. 8, 1957 — 2 Sheets-Sheet 1

INVENTOR
TRUEMAN O'QUINN
BY Beale and Jones
ATTORNEYS

Jan. 19, 1960 T. O'QUINN 2,921,762
HOSE NOZZLE HOLDER
Filed Feb. 8, 1957 2 Sheets-Sheet 2
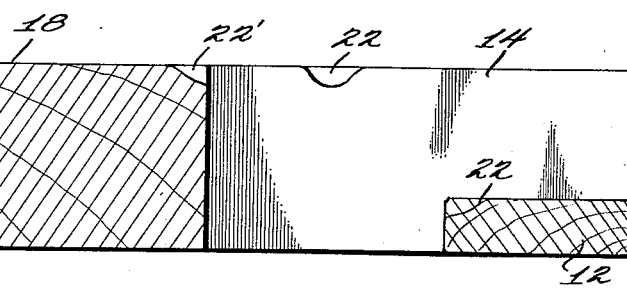
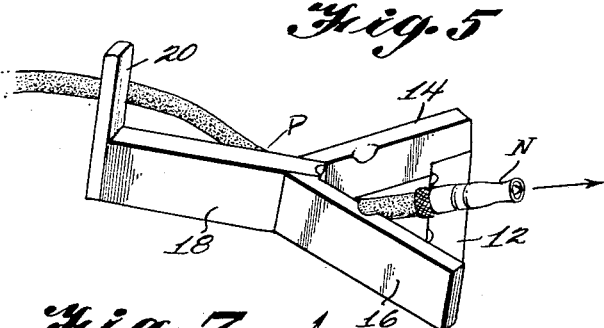
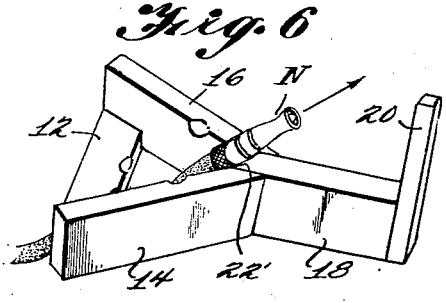
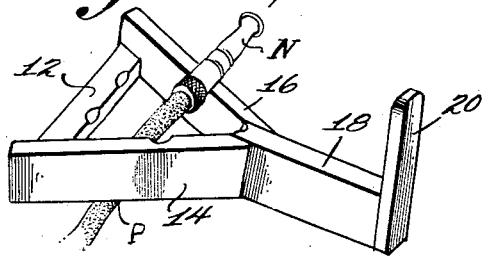
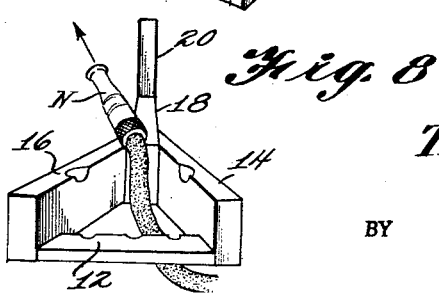
INVENTOR
TRUEMAN O'QUINN
BY Beale and Jones
ATTORNEYS

United States Patent Office 2,921,762
Patented Jan. 19, 1960

2,921,762

HOSE NOZZLE HOLDER

Trueman O'Quinn, Austin, Tex.

Application February 8, 1957, Serial No. 639,008

1 Claim. (Cl. 248—75)

This invention relates to a hose nozzle holder. More specifically, this invention relates to a hose nozzle holder which is adapted to hold a hose nozzle in an infinite number of positions so that the hose nozzle may assume a limitless number of directions and elevations. It is especially adaptable at holding the nozzle firmly despite the opposing force on the hose exerted by water pressure within the hose.

In the prior art, a number of hose nozzle holders have been disclosed. Each one of these holders has some inherent drawback. For instance, some are capable of holding a hose nozzle in only one position or two or three positions so that it is impossible to get the direction and elevation of the nozzle that the user desires. Others cannot hold a hose against the force of the water pressure on it. Others are lacking in that they require penetration into the ground by a prong member, a process requiring exertion of force especially when the ground is dry and hard. Still other hose nozzle holders include moving parts such as clamps or adjustable legs and are likely to get out of order. Still others are subject to corrosion by the nature of their composition.

An object of this invention is to present a hose nozzle holder which is subject to none of the above-mentioned disadvantages. With its use the hose nozzle may be made to assume any of a limitless number of directions and elevations. It holds the hose firmly. It requires no penetration into the ground, has no moving parts and cannot rust or corrode. In addition, it is extremely inexpensive and easy to use.

Briefly, this invention is a hose nozzle holder comprising a frame including a plurality of frame members lying on substantially the same plane, said members being of different dimension in a direction transverse to said plane. The frame is adapted to lie on the ground with one of its members propping up the hose nozzle while another of its members overlies the hose at a distance spaced from the nozzle. The weight of the frame is sufficient to hold down firmly the superposed portion of the hose so that it engages the ground. In this arrangement the elevation of the nozzle is dependent in part on the dimension of the frame member which props up said hose member, said dimension being measured in a direction perpendicular to said plane. It is also dependent on the distance between the nozzle and the superposed portion of hose. Attached to the frame may be an elongated member with a perpendicular extension on the end thereof, said perpendicular extension adapted to be used as a handle.

This invention embodies other novel features, details of construction and arrangement of parts which are hereinafter set forth in the specification and claim, and illustrated in the accompanying drawings, wherein:

Fig. 4 is a sectional elevational view along the lines 4—4 of Fig. 2;

Figs. 5 thru 8 are perspective views showing the hose holder in operation with the hose disposed at various angles and directions with respect to the holder.

Figure 1:
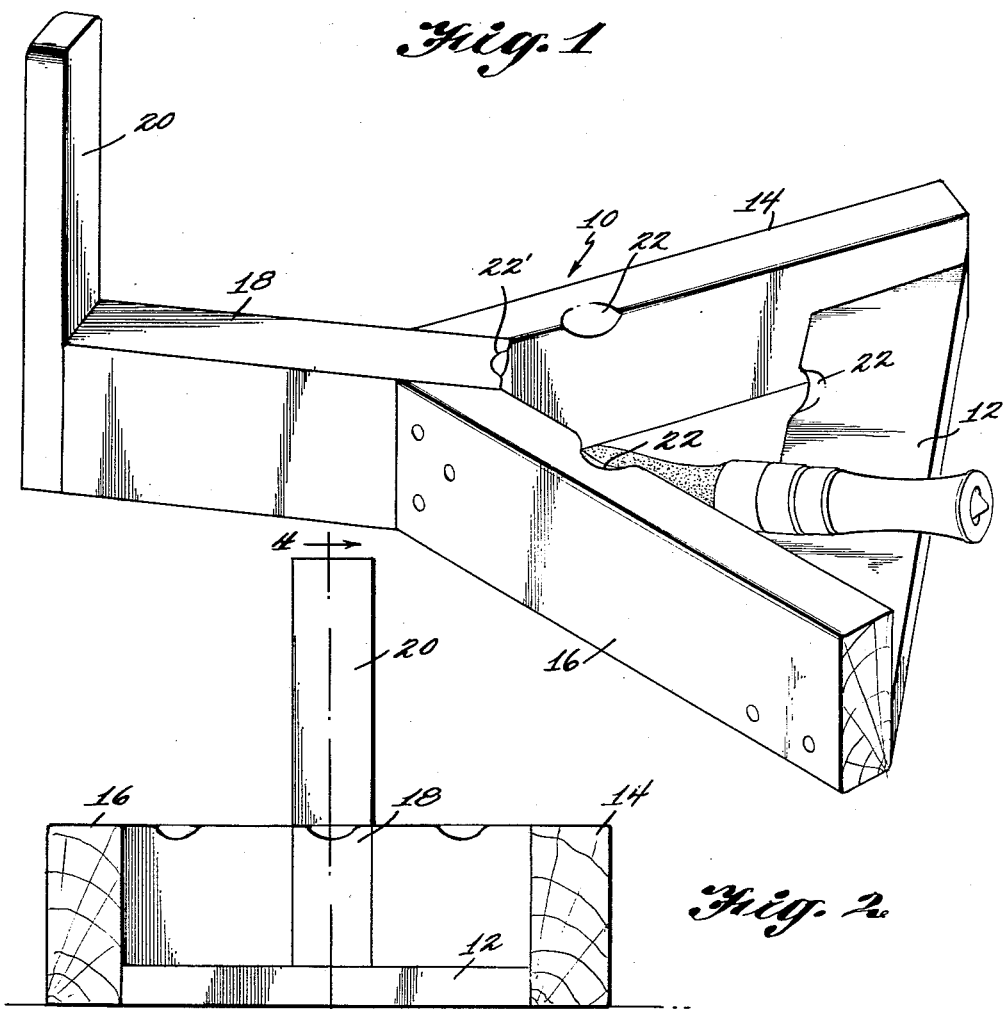
Fig. 1 is a side perspective view slightly from above showing my hose nozzle holder in use.
Figure 2:
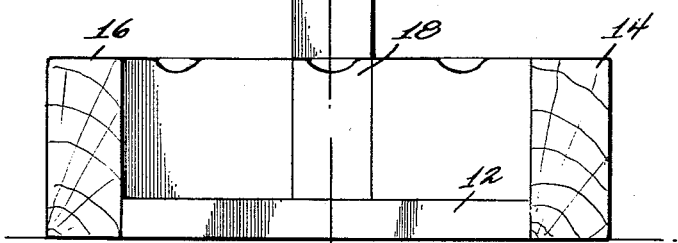
Fig. 2 is a front elevational view of my holder.
Figure 3:
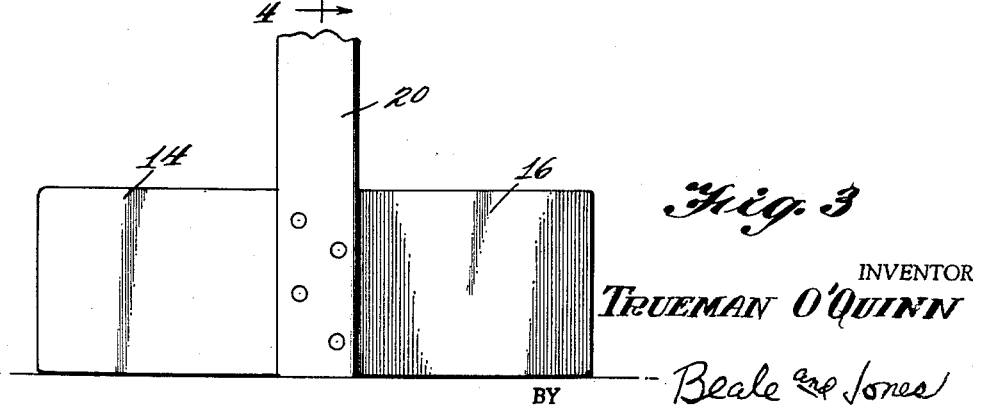
Fig. 3 is a rear elevational view of my holder.

Referring more specifically to the drawing, my invention is a hose nozzle holder broadly designated by the numeral 10 in Fig. 1. It comprises an open triangular frame including the frame members 12, 14, and 16. These members lie substantially on a common plane. The frame members are of different dimension in a direction measured transverse to said plane. It will be noted, for instance, that member 12 is of considerably less height than the other members 14 and 15. While the drawings show members 14 and 16 of equal height, it should be understood that the member 14 and the member 16 can be of different height. Connected to the frame and extending from it is the stem member 18. This elongated member has fastened to its free end the perpendicularly extending upright 20.

The purpose of the stem member 18 and the perpendicularly extending upright 20 is to serve as means for moving the frame member remotely so that the operator will not be in danger of getting his clothes wet during the adjustment.

The inner upper edges of the frame members 12, 14, and 16 are notched, as at 22. Also the member 18 is notched as at 22' where it joins the frame. This notching is for the purpose of holding the hose in position on the respective members without its slipping.

Figs. 5 thru 8 show the hose nozzle holder in use. A good idea of how the holder operates is especially disclosed in Fig. 7. The nozzle N of the hose is supported in a notch 22 in the member 16 of the frame. Another member 14 of the frame overlies the portion P of the hose at a distance spaced back from the nozzle N. The frame is of sufficient weight so that the member 14 bearing down on the portion P is sufficient to depress it so that the bottom surface of the hose portion P is resting flat on the ground. It is necessary that the holder be of sufficient weight to so hold down the hose portion P even when there is water pressure in the hose. Preferably, therefore, my holder is made of heavy wooden members which not only provide the necessary weight but also are not subject to corrosion.

Fig. 5 shows the nozzle N propped on the frame member 12 and resting in a notch 22 therein. At a distance spaced back from the nozzle, the hose portion P is superposed by the frame member 14 which holds it down.

Figs. 6 and 8 shows the nozzle N resting in the notch 22' on the end of the same stem member 12 which is part of the frame. Contrasting this view with the view of Fig. 5, it can be seen that the nozzle N is much more severely elevated in Fig. 6 than in Fig. 5. This, of course, is because the nozzle propping member is of greater height in Fig. 6 than in Fig. 5.

It can be surmised from the effect of a higher prop member on the elevation of the hose that if the triangular frame were altered to include members of a third or fourth height, the number of positions of the nozzle could be greatly increased. For instance, if the frame member 14 were of a height intermediate the heights of the members 16 and 12 an intermediate position of the hose nozzle could be obtained.

It also can be surmised from these views that even with frame members of two heights, an infinite variety of nozzle elevations can be obtained by adjusting the distance between the nozzle and the superposed portion of the hose. For instance, if it is desired to elevate the nozzle N to even lesser degree than shown in Fig. 5, the nozzle may be moved out from the frame so that the nozzle head will droop somewhat in a lesser elevation. If it is desired to elevate the nozzle to a higher degree than that shown in Fig. 6, the holder may be moved toward the direction of the water flow so that the nozzle is supported at its very tip in the notch 22' and the portion of the hose superposed by the frame member 18 will cause the nozzle to incline at a more abrupt angle.

Thus it can be seen that my invention is a nozzle holder which combines in a simple rugged inexpensive structure all the advantages which have been long desired. It holds the nozzle in an infinite number of elevations and holds it firmly against the force of water pressure in the hose. It has no moving parts and cannot corrode. It requires no penetration of the ground for its operation.

While this invention has been shown in but one form, it is obvious to those skilled in the art that it is not so limited but is susceptible of various changes and modifications without departing from the scope and spirit of the claimed invention.

I claim as my invention:

A holder for a hose nozzle on the end of a hose, said holder comprising a triangular frame including three connected frame members, said frame members on one side lying in a common plane, said frame members on the opposite side lying in at least two different planes, and said frame members on said last-mentioned side having notches in their edges toward the center of said triangular frame, said holder adapted to be placed on the ground with one of said frame members adapted to prop up the nozzle of such hose, such nozzle resting in one of said notches, and another of said frame members adapted to superpose a portion of such hose at a distance spaced back from such nozzle, said frame being of sufficient weight to hold down the portion of hose that is superposed by a frame member, the incline of such nozzle being in part dependent on the dimension of said nozzle propping member in a direction perpendicular to said common plane.

References Cited in the file of this patent
UNITED STATES PATENTS

| | | |
|---|---|---|
| D. 159,558 | Sandell | Aug. 1, 1950 |
| 314,751 | Taylor | Mar. 31, 1885 |
| 1,065,202 | Bailey | June 17, 1913 |
| 1,479,943 | Thompson | Jan. 8, 1924 |